(12) United States Patent
Nakazato et al.

(10) Patent No.: US 10,304,206 B2
(45) Date of Patent: May 28, 2019

(54) SELECTING FEATURE PATTERNS AND CORRESPONDING LAYOUT POSITIONS FOR VIEWPOINT MEASUREMENT

(71) Applicant: CANON KABUSHIKI KAISHA, Tokyo (JP)

(72) Inventors: Yusuke Nakazato, Tokyo (JP); Daisuke Kotake, Yokohama (JP); Akihiro Katayama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 315 days.

(21) Appl. No.: 15/410,030

(22) Filed: Jan. 19, 2017

(65) Prior Publication Data
US 2017/0206676 A1 Jul. 20, 2017

(30) Foreign Application Priority Data

Jan. 19, 2016 (JP) .................................. 2016-008282

(51) Int. Cl.
*G06T 7/73* (2017.01)
*G06T 7/33* (2017.01)
(Continued)

(52) U.S. Cl.
CPC ............... *G06T 7/73* (2017.01); *G02B 27/32* (2013.01); *G06T 7/33* (2017.01); *G06T 11/60* (2013.01);
(Continued)

(58) Field of Classification Search
CPC .. G02B 27/32; G06T 7/33; G06T 7/73; G06T 7/74; G06T 7/75; G06T 11/60; G06T 2207/10024; G06T 2207/30208
See application file for complete search history.

(56) References Cited

U.S. PATENT DOCUMENTS

2005/0069196 A1* 3/2005 Uchiyama ............ G06K 9/3216
382/154
2005/0210415 A1* 9/2005 Bree ......................... G06T 5/50
715/848
(Continued)

FOREIGN PATENT DOCUMENTS

JP 4689380 B2 2/2011

OTHER PUBLICATIONS

Hirose et al. ("A vision-based AR registration method utilizing edges and vertices of 3D model," Proceedings of the 2005 international conference on Augmented tele-existence, Dec. 5-8, 2005) (Year: 2005).*

(Continued)

*Primary Examiner* — Yubin Hung
(74) *Attorney, Agent, or Firm* — Carter, DeLuca & Farrell LLP

(57) ABSTRACT

An information processing apparatus: obtains a feature distribution by calculating a distribution of features, existing in an environment, that can be used to measure a position and orientation of a measurement viewpoint; decides on a feature pattern to be laid out and a layout position of the feature pattern in the environment that enable the obtainment of a feature distribution that enhances an accuracy at which the position and orientation of the measurement viewpoint is calculated; and presents the feature pattern and the layout position of the feature pattern that have been decided on.

22 Claims, 6 Drawing Sheets

(51) Int. Cl.
*G06T 11/60* (2006.01)
*G02B 27/32* (2006.01)

(52) U.S. Cl.
CPC .......................... *G06T 7/74* (2017.01); *G06T 7/75* (2017.01); *G06T 2207/10024* (2013.01); *G06T 2207/30208* (2013.01)

(56) References Cited

U.S. PATENT DOCUMENTS

| | | | | |
|---|---|---|---|---|
| 2005/0253870 | A1* | 11/2005 | Kotake | G06T 7/73 345/633 |
| 2006/0071945 | A1* | 4/2006 | Anabuki | G06F 3/0325 345/633 |
| 2007/0139322 | A1* | 6/2007 | Takemoto | G06F 3/0346 345/87 |
| 2015/0130790 | A1* | 5/2015 | Vasquez, II | G06T 19/006 345/419 |
| 2015/0185027 | A1* | 7/2015 | Kikkeri | G01C 25/00 701/533 |
| 2015/0352719 | A1 | 12/2015 | Nakazato et al. | |
| 2016/0104314 | A1 | 4/2016 | Nakazato et al. | |
| 2016/0155235 | A1 | 6/2016 | Miyatani et al. | |
| 2016/0260027 | A1 | 9/2016 | Kuwabara et al. | |

OTHER PUBLICATIONS

Oe et al. ("Estimating camera position and posture by using feature landmark database," 14th Scandinavian Conference on Image Analysis, 2005) (Year: 2005).*

State et al. ("Superior augmented reality registration by integrating landmark tracking and magnetic tracking," ACM SIGGRAPH 1996, Aug. 1996) (Year: 1996).*

Baratoff et al. ("Interactive multi-marker calibration for augmented reality applications," Proceedings of the International Symposium on Mixed and Augmented Reality, 2002) (Year: 2002).*

Freeman et al. ("A Method for Predicting Marker Tracking Error," Proceedings of the 2007 6th IEEE and ACM International Symposium on Mixed and Augmented Reality, Nov. 2007) (Year: 2007).*

Hoff, W. et al., "Analysis of Head Pose Accuracy in Augmented Reality," IEEE Transactions on Visualization and Computer Graphics, Oct.-Dec. 2000, pp. 1-16, vol. 6., No. 4.

* cited by examiner

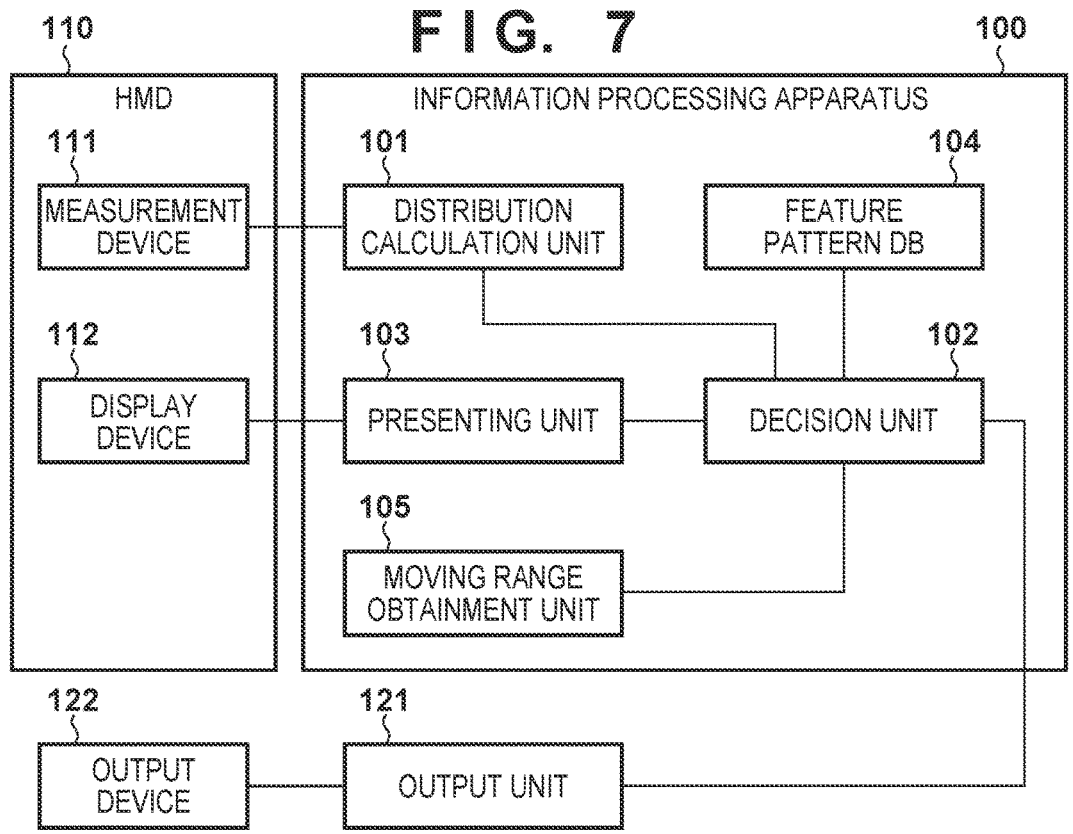
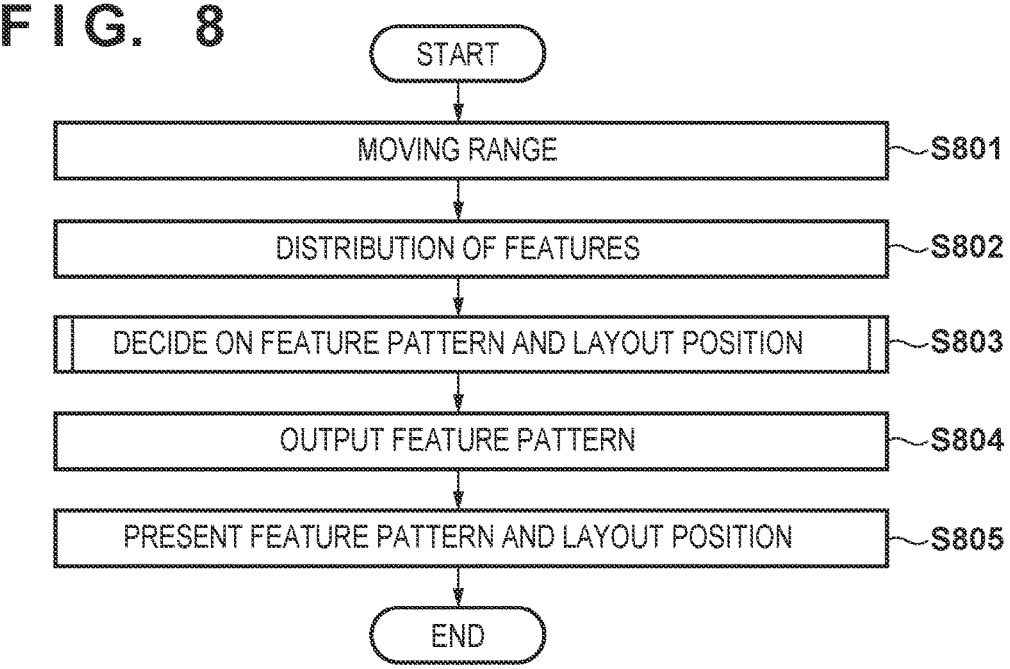

SELECTING FEATURE PATTERNS AND CORRESPONDING LAYOUT POSITIONS FOR VIEWPOINT MEASUREMENT

BACKGROUND OF THE INVENTION

Field of the Invention

The present invention relates to a technique for calculating a position and orientation of a measurement viewpoint on the basis of features extracted from measured data.

Description of the Related Art

Techniques that use features (natural feature points, markers, or the like) visible in an image, a range image, or the like obtained from a camera, a three-dimensional measuring sensor, or the like to calculate a position and orientation of the camera (a measurement viewpoint) are being widely used in self-localization for MR, AR, robots, and the like. Note that "MR" is an acronym for "Mixed Reality" while "AR" is an acronym for "Augmented Reality". In such techniques, the accuracy at which the position and orientation of the camera (measurement viewpoint) are calculated varies depending on the arrangement of the features in a scene. It is necessary to adjust how a given feature pattern will be laid out in advance in order to calculate the position and orientation of the measurement viewpoint with the desired level of accuracy. Furthermore, to realize more convincing MR, it is necessary to ensure that the feature pattern that is laid out does not undermine the scenery.

Japanese Patent No. 4689380 (called "Patent Document 1" hereinafter) discloses a method, used in the case where the position and orientation of a camera is estimated using markers (printed products in which an identifier is coded as a predetermined geometric pattern) as features, for finding where the marker should be arranged in an environment. According to this method, region information pertaining to an accuracy at which a real space and a virtual space overlap is calculated on the basis of information of an index arranged in the real space; the region information is then visualized and displayed superimposed on the real space, which enables a user to find the arrangement of the marker in an interactive manner.

However, the method according to Patent Document 1 requires that a process of trial and error, in which the marker is arranged provisionally and the result thereof is then confirmed, be carried out repeatedly, and thus the task of laying out the feature (marker) takes time.

SUMMARY OF THE INVENTION

According to an embodiment of the present invention, by presenting a feature pattern for accurately calculating a position and orientation of a measurement viewpoint, and a layout position of the feature pattern, the task of laying out the feature pattern can be simplified.

According to one aspect of the present invention, there is provided an information processing apparatus comprising: a calculation unit configured to obtain a feature distribution by calculating a distribution of features, existing in an environment, that can be used to measure a position and orientation of a measurement viewpoint; a deciding unit configured to decide on a feature pattern to be laid out and a layout position of the feature pattern in the environment that enable the obtainment of a feature distribution that enhances an accuracy at which the position and orientation of the measurement viewpoint is calculated; and a presenting unit configured to present the feature pattern and the layout position of the feature pattern decided on by the deciding unit.

Furthermore, according to another aspect of the present invention, there is provided a control method for an information processing apparatus, the method comprising: obtaining a feature distribution by calculating a distribution of features, existing in an environment, that can be used to measure a position and orientation of a measurement viewpoint; deciding on a feature pattern to be laid out and a layout position of the feature pattern in the environment that enable the obtainment of a feature distribution that enhances an accuracy at which the position and orientation of the measurement viewpoint is calculated; and presenting the feature pattern and the layout position of the feature pattern that have been decided on.

Further features of the present invention will become apparent from the following description of exemplary embodiments (with reference to the attached drawings).

BRIEF DESCRIPTION OF THE DRAWINGS

FIG. 7 is a diagram illustrating the configuration of an information processing apparatus 100 according to a fourth embodiment.

FIG. 8 is a flowchart illustrating processing carried out by the information processing apparatus 100 according to the fourth embodiment.

DESCRIPTION OF THE EMBODIMENTS

Hereinafter, preferred embodiments of the present invention will be described in detail with reference to the appended drawings.

First Embodiment

Overview

The present embodiment will describe an arrangement of markers in the advance setup of an MR system that displays virtual content superimposed on a real-world image on the basis of the position and orientation of a camera. In the MR system, an image of a scene is obtained by a camera provided in a head-mounted display (HMD), and corner points are detected as features from the image. The position and orientation of the camera is calculated on the basis of the correspondences between respective corner points from image to image obtained in time series, and the virtual content is displayed superimposed on the image obtained by the HMD camera on the basis of the calculated position and orientation.

In the present embodiment, an environment in which the MR system is used is observed using the camera provided in the HMD, and a feature pattern including features favorable for accurately calculating the position and orientation of the camera in that environment is decided and printed. A position where that feature pattern is to be arranged is furthermore presented. Here, the "feature pattern" is a pattern through which features used to calculate the position and orientation of a measurement viewpoint can be detected. In the present embodiment, a two-dimensional graphic prepared in advance is used as the feature pattern. Generally, having the features distributed uniformly through an image makes it easier to accurately calculate the position and orientation of the camera. Accordingly, in the present embodiment, a feature distribution is obtained from the image observed through the camera, the quality of that feature distribution is expressed as an evaluation value (a registration evaluation value) indicating a level of uniformity of the feature distribution, and the feature pattern and layout position are decided on so as to increase the registration evaluation value. Furthermore, in the present embodiment, the feature pattern that has been decided on is printed using a printer, and the layout position of the feature pattern is presented to a user through the MR system. The user may then arrange the printed feature pattern in the environment while viewing the layout position of the feature pattern presented through the HMD. The present embodiment will be described in detail hereinafter.

Configuration

Figure 1:
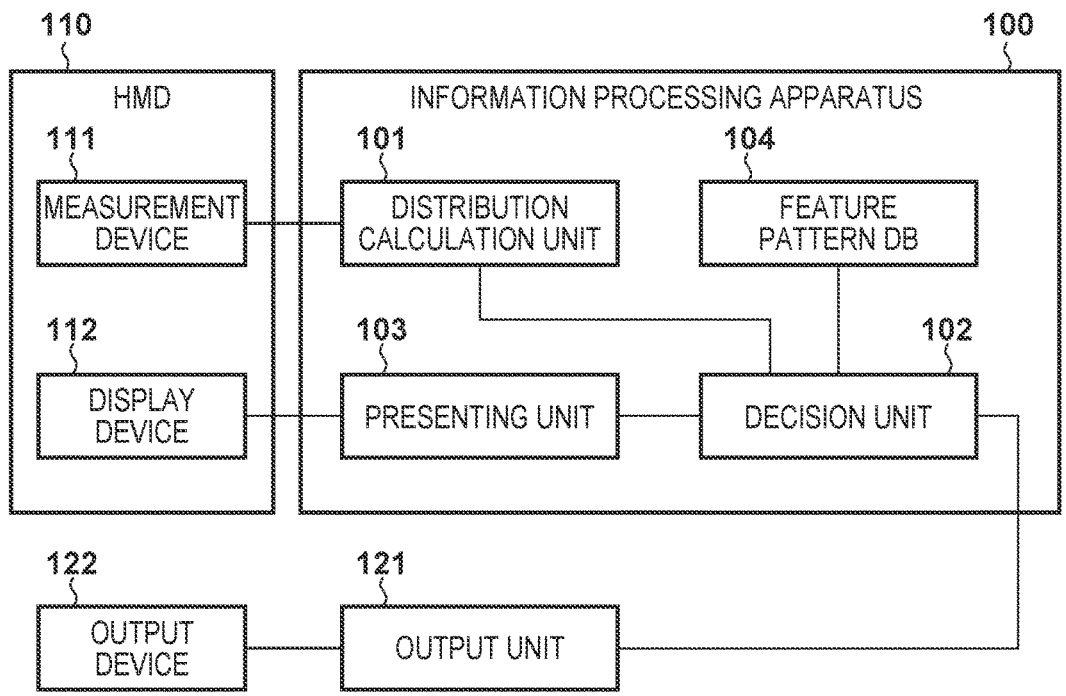
FIG. 1 is a diagram illustrating an example of the configuration of an information processing apparatus 100 according to a first embodiment.

FIG. 1 is a block diagram illustrating a module configuration of an information processing apparatus 100, as well as connections thereof to an HMD 110 and an output unit 121 that are external devices, according to the present embodiment. The information processing apparatus 100 includes a distribution calculation unit 101, a decision unit 102, and a presenting unit 103. The HMD 110 is provided with a measurement device 111 including a camera capable of capturing images, and a display device 112 including a panel (a liquid crystal panel in the present embodiment) for displaying images. Note that in the present embodiment and the other embodiments described later, the module configuration of the information processing apparatus can be implemented by a CPU (not illustrated) of the information processing apparatus executing a predetermined program stored in a memory (also not illustrated), for example. However, the modules of the information processing apparatus may be completely or partially realized by dedicated hardware.

The distribution calculation unit 101 calculates a distribution of features, which exist in an environment, that can be used to measure a position and orientation of a measurement viewpoint (also called a "feature distribution" hereinafter). In the present embodiment, the distribution calculation unit 101 calculates a distribution of features that can be observed by the measurement device 111. Here, the feature distribution is a distribution of features of the same type as the features used to calculate the position and orientation of the measurement viewpoint. For example, the distribution calculation unit 101 detects, as the features, corner points from an image measured by the measurement device 111 of the HMD 110; obtains two-dimensional positions (coordinate values) of the detected corner points; and generates a list of the coordinate values of the corner points as the feature distribution. The corner points are the features used to calculate the position and orientation of the measurement viewpoint.

The decision unit 102 decides on the feature pattern to be laid out, and a layout position thereof, on the basis of the feature distribution obtained by the distribution calculation unit 101. The feature pattern to be laid out and the layout position thereof are decided on such that, for example, the level of uniformity of the feature distribution in the environment is enhanced, in order to obtain a feature distribution that enhances the accuracy of calculation of the position and orientation of the measurement viewpoint. In the present embodiment, the image measured by the measurement device 111 is divided into rectangular regions, and by laying out the feature pattern in the rectangular regions, the position of a rectangular region in which the registration evaluation value is enhanced by greater than or equal to a predetermined amount is decided on as the layout position of the feature pattern. The "registration evaluation value" is an evaluation value correlated with the accuracy at which the measurement device 111 estimates the position and orientation, and as described above, the level of uniformity of the feature distribution is used as this value in the present embodiment. More specifically, in the present embodiment, a number of rectangular regions that include a feature is used as the registration evaluation value, and for example, the position of a rectangular region that does not include features are decided on as the layout position of the feature pattern.

Additionally, the decision unit 102 can detect a predetermined number or more of features in order to enhance the registration evaluation value, and can decide to use a feature pattern having a shape similar to a shape existing in the environment as the feature pattern to be laid out. In other words, an evaluation of a degree to which the feature pattern matches the environment in the layout position (a content matching degree) is considered when selecting the feature pattern. The content matching degree can be obtained as a degree to which attribute information of the environment and attribute information of the feature pattern match.

In the present embodiment, a plurality of types of feature patterns that can be laid out are assumed to be registered in advance in a database (called a "feature pattern DB 104" hereinafter). An image and attributes of each feature pattern are registered in the feature pattern DB 104. A two-dimensional graphic, a poster, or the like is used as the feature pattern in the present embodiment. Meanwhile, the "attributes" include "registration attributes" pertaining to the accuracy and stability of calculating the position and orientation of the measurement viewpoint, and "content attributes" used to evaluate relevancy with a surrounding environment, properties and details of the user and the feature pattern, and so on. The decision unit 102 calculates an evaluation value from these attributes and attributes extracted from the environment (called a "pattern evaluation value" hereinafter), and decides to use a feature pattern having a high pattern evaluation value as the feature pattern to be laid out.

The presenting unit 103 presents the feature pattern decided on by the decision unit 102, and the layout position thereof, to the user. Here, a composite image, in which the feature pattern decided on by the decision unit 102 is superimposed on an image captured by the measurement device 111 in the layout position decided on by the decision unit 102, is output to the display device 112 of the HMD 110. The display device 112 thus presents the layout position of the feature pattern to the user. Meanwhile, by the output unit 121 outputting the feature pattern decided on by the decision unit 102 to an output device 122, the feature pattern that has been decided on and is to be laid out can be obtained as an object that can actually be laid out. In the present embodiment, the feature pattern is printed by the output device 122. Accordingly, the output device 122 is a printer in the present embodiment.

Flow of Processing

Figure 2:
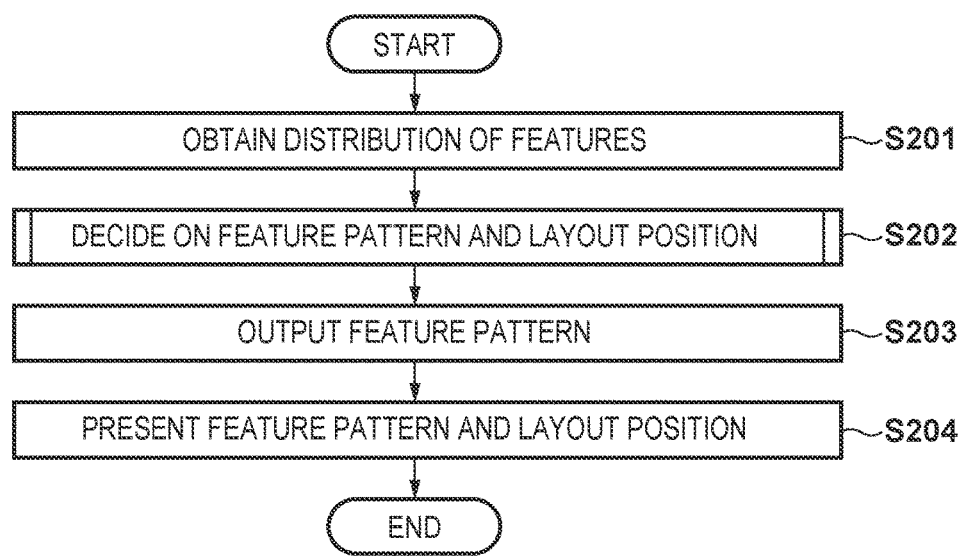
FIG. 2 is a flowchart illustrating processing carried out by the information processing apparatus 100 according to the first embodiment.

Processing according to the present embodiment will be described in detail with reference to the flowchart in FIG. 2. Note that in the processing indicated in the flowchart of FIG. 2, it is assumed that the position and orientation of the HMD 110 (the measurement device 111) are calculated on the basis of a position and orientation sensor (not illustrated), feature points existing in an image currently being obtained from the measurement device 111, or the like.

Figure 3A:
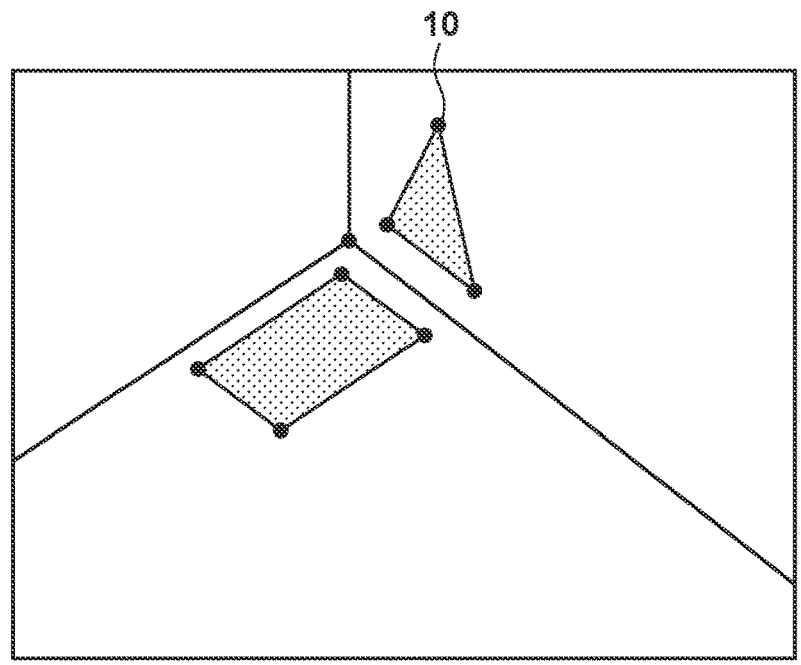
FIGS. 3A and 3B are diagrams illustrating an example of an input image and of a presented image according to the first embodiment.

In step S201, the distribution calculation unit 101 obtains the feature distribution by calculating a distribution of features that can be observed through the measurement device 111. In the present embodiment, the distribution calculation unit 101 obtains an image from the measurement device 111 provided in the HMD 110, detects corner points as the features from the obtained image, and generates a list of coordinate values (two-dimensional positions) of the detected corner points as the feature distribution. FIG. 3A illustrates an example of the obtained image and the corner points detected from that image. The black circles 10 in FIG. 3A are the detected corner points. Various methods have been proposed as methods for detecting the corner points, and although any known method may be used, the present embodiment assumes that a Harris corner detector is used.

In step S202, the decision unit 102 decides on the feature pattern to be laid out and the layout position thereof on the basis of the feature distribution calculated in step S201, specifically on the basis of the list of the coordinate values of the two-dimensional positions of the corner points in the image. The processing performed in this step will be described in detail later with reference to the flowchart in FIG. 4. In step S203, the output unit 121 outputs the feature pattern decided on in step S202 to the output device 122 and prints that pattern. Here, the print size of the feature pattern is set to a default size, or the user specifies the size.

In step S204, the presenting unit 103 generates a composite image for instructing the feature pattern decided on in step S202 to be laid out in the position decided on in step S202, and displays the generated composite image using the display device 112. The composite image is generated as follows, for example. First, the presenting unit 103 generates an image in which a rectangular region corresponding to the layout position of the feature pattern decided on in step S202 is shaded with a given color. The presenting unit 103 then renders the feature pattern decided on in step S203 in that rectangular region so as to fit therein, superimposes that image on the image captured by the measurement device 111, and displays the resulting image in the display device 112. At this time, the position and orientation of the measurement device 111 are calculated on the basis of a position and orientation sensor (not illustrated), feature points existing in the image currently being obtained from the measurement device 111, or the like, as described above.

Figure 3B:
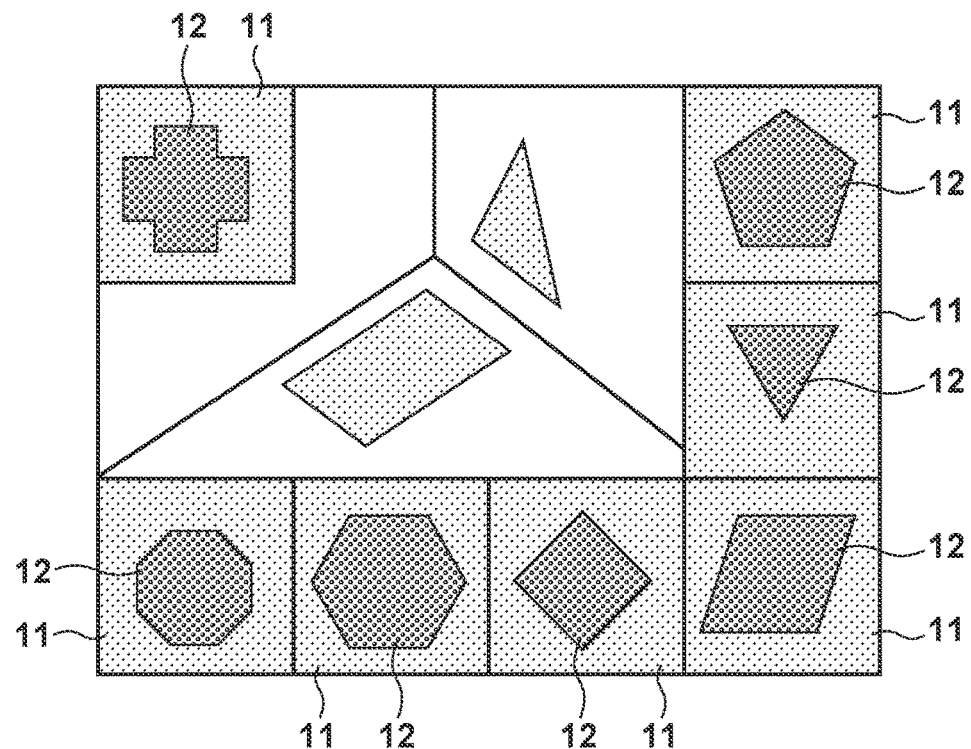

FIG. 3B illustrates an example of an image that presents the feature layout position, displayed in the display device 112 when the image illustrated in FIG. 3A has been captured by the measurement device 111 (the camera). Rectangular regions 11 shaded with a given color (indicated with hatching in FIG. 3B) indicate positions where features are to be laid out, and graphics 12 indicate the feature patterns to be laid out in the rectangular regions 11. Feature patterns to be laid out for rectangular regions in which the corner points expressed by the feature distribution do not exist are presented here. The user may lay out the feature patterns expressed by the graphics 12 indicated in the rectangular regions 11, in the positions indicated by the rectangular regions 11, in accordance with the presented information.

Figure 4:
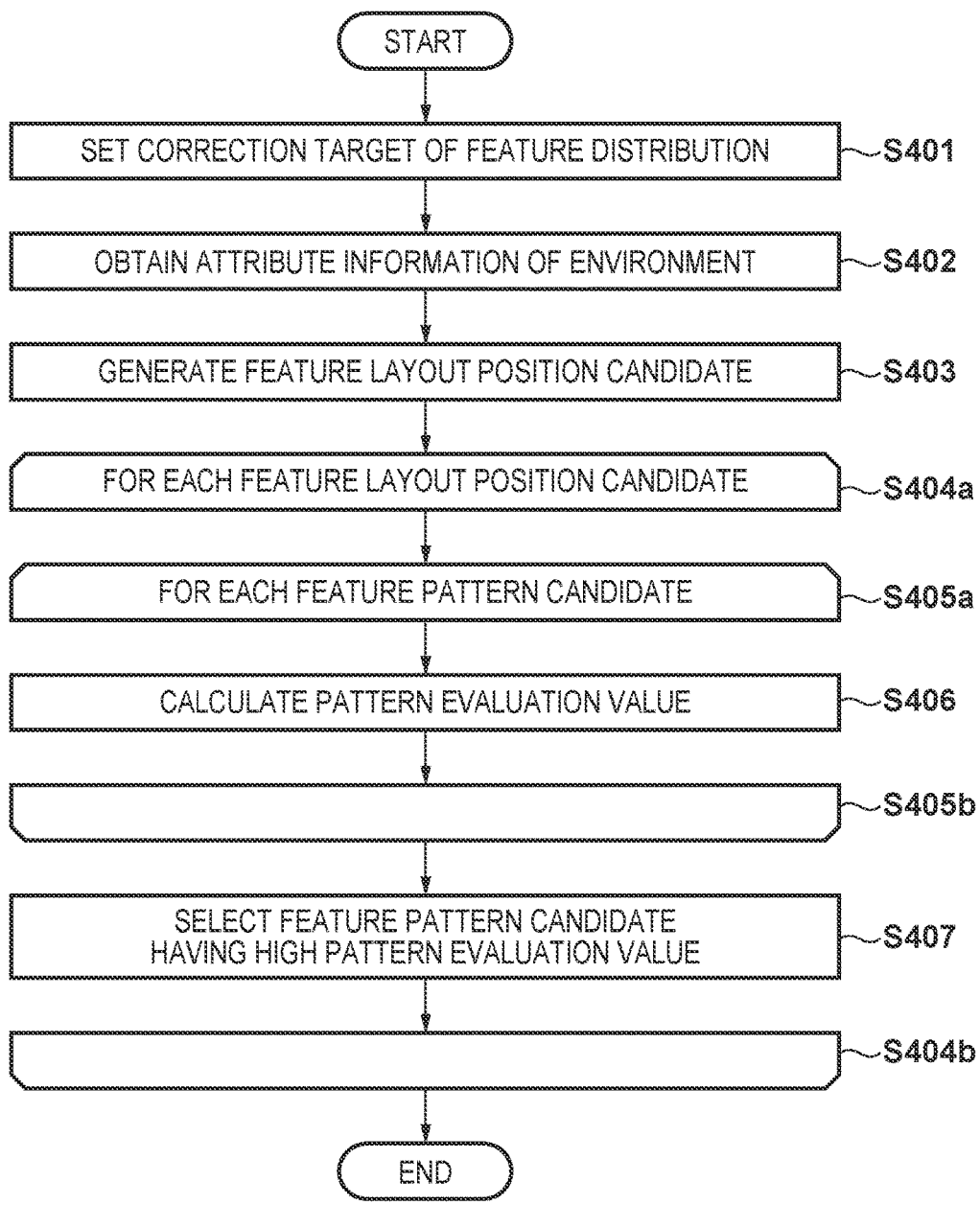
FIG. 4 is a flowchart illustrating a process for deciding on a feature pattern and a layout position according to the first embodiment.

Next, the processing of step S202, in which the feature pattern and the layout position thereof are decided on, will be described in detail using the flowchart in FIG. 4.

In step S401, the decision unit 102 sets a correction target for the feature distribution. In the present embodiment, the total number of rectangular regions containing a predetermined number (N) or more features is used as the registration evaluation value, and thus the number N of features to be detected from a single rectangular region is set as the correction target for the feature distribution. Note that a default value (1, for example) is set in the case where the correction target is not set. In the above example, in which the rectangular regions in which corner points do not exist are determined to be positions where the feature patterns are to be set, the correction target N=1.

In step S402, the decision unit 102 obtains the attribute information of the environment. Here, the image measured by the measurement device 111 (the captured image) is analyzed, and a ratio of straight lines among lines detected from the image is calculated as the content attributes of the environment. A known method can be used to calculate the ratio of straight lines in the image. Next, in step S403, the decision unit 102 generates a plurality of positions where features can be added as feature layout position candidates. Specifically, the following procedure is used.

First, with respect to the feature distribution obtained in step S201, the decision unit 102 calculates and holds the registration evaluation value for evaluating the quality of the accuracy at which the measurement device estimates the position and orientation. The registration evaluation value is a value expressing the level of uniformity of the distribution of the positions of the corner points in the image, and is calculated for a given feature distribution. In the present embodiment, for example, the image is divided into non-overlapping rectangular regions of a predetermined size; then, for each region, 1 is added to the registration evaluation value in the case where the region contains N (a correction target value) or more corner points, and a sum obtained as a result is taken as the registration evaluation value.

Next, the decision unit 102 takes a list of center coordinates of the rectangular regions as the feature layout position candidates, and then calculates and holds a registration evaluation value for a feature distribution in the case where a provisional feature pattern has been added to each feature layout position candidate. A feature pattern selected at random from the feature pattern DB 104 is used as the provisional feature pattern. However, the provisional feature pattern is not limited thereto, and a predetermined feature pattern may be used, for example. In other words, the provisional feature pattern may be any pattern containing features that can be detected by the distribution calculation unit 101. Meanwhile, for example, in the case where the sum of the rectangular regions containing the predetermined number or more of features (corners) is used as the registration evaluation value as described above, it may be assumed, for the provisional feature pattern, that there are features within the rectangular regions serving as the feature layout position candidates.

Furthermore, the decision unit 102 extracts, from the above-described feature layout position candidates, a feature layout position candidate at which the amount of enhancement of the registration evaluation value in the case where the provisional feature pattern is laid out (an increase from the registration evaluation value calculated in step S401) is greater than or equal to a predetermined value. Because the number of rectangular regions is used as the registration evaluation value in the present embodiment, the amount of increase in the evaluation value resulting from the provisional feature pattern being laid out for a suitable feature layout position candidate is 1. As such, feature layout position candidates with which the amount of enhancement of the registration evaluation value is 1 or more are extracted. The decision unit 102 then generates a list of the feature layout position candidates that are ultimately extracted, or in other words, a list of the center coordinates of the rectangular regions. In the case where the registration evaluation value is calculated using the method described in step S401 in the present embodiment, the amount of enhancement of the registration evaluation value is 0 or 1. Here, the above-described predetermined value with which the amount of enhancement of the registration evaluation value is compared is taken as 1, and feature layout position candidates with which the amount of enhancement of the registration evaluation value is 1 (or more) are extracted.

Step S404*a* to step S404*b* are a processing loop for executing the processes of S405 to S407 for each feature layout position candidate. The decision unit 102 carries out the process for selecting the feature pattern to be laid out (S405 to S407) for each feature layout position candidate existing in the feature layout position candidate list generated in step S403.

Step S405*a* to step S405*b* are a processing loop for executing the process of calculating the pattern evaluation value, carried out in step S406, for each feature pattern candidate registered in the feature pattern DB 104. The decision unit 102 carries out the process for calculating the pattern evaluation value (S406) for each of feature pattern candidates registered in the feature pattern DB 104. In step S406, the decision unit 102 calculates the pattern evaluation value for the feature pattern candidate in a feature layout position candidate of interest. The product of a registration matching degree and a content matching degree, which will be described below, is used here as the pattern evaluation value.

The registration matching degree is an evaluation value that increases as the accuracy, stability, and so on of the calculation of the position and orientation of the measurement viewpoint rises. The position and orientation can be calculated in a stable manner as long as a sufficient number of features can be detected, and thus, for example, a number of detectable features (a number of corner points) in the registration attributes of the feature pattern is used as the registration matching degree. On the other hand, the content matching degree is an evaluation value that increases the more the feature pattern is suitable for an application that uses the position and orientation of the measurement viewpoint, a user thereof, a surrounding environment, and so on. In the present embodiment, the ratio of straight lines detected from the feature pattern is used as the content matching degree, such that a feature pattern having a shape resembling the surrounding environment is selected. Specifically, the ratio of straight lines is calculated on the basis of line segments detected from an image of the feature pattern included in shape information in the content attributes of the feature pattern, and a degree of resemblance with the content attributes of the environment calculated in step S403 (a ratio of straight lines detected from an image of the environment) is taken as the content matching degree. In other words, $$1 - |\text{ratio of straight lines contained in feature pattern} - \text{ratio of straight lines contained in environment}|$$

is calculated as the content matching degree.

Once the pattern evaluation value has been calculated for each feature pattern candidate as described above, the process advances to step S407. In step S407, the decision unit 102 selects the feature pattern candidate having the highest pattern evaluation value calculated in step S406 as the feature pattern to be laid out in the feature layout position of interest. The feature pattern to be laid out in each feature layout position candidate is determined by executing the above-describe processing for all of the feature layout position candidates.

As described thus far, according to the first embodiment, the feature pattern to be laid out, and the layout position thereof, for accurately calculating the position and orientation of the measurement device (the camera), can be automatically decided on and presented to the user. Accordingly, the user can know the feature pattern to be laid out and the layout position thereof without trial and error, which makes it possible to shorten the time required for the task of laying out the feature pattern.

Variation 1-1

In the first embodiment, an image obtained by the measurement device 111 (the camera) is used by the distribution calculation unit 101 to calculate the feature distribution. However, the image for calculating the feature distribution is not limited to a two-dimensional image captured in this manner. For example, the image for calculating the feature distribution may be an image obtained from the storage device (not illustrated), or may be an environmental simulation image generated on the basis of a three-dimensional model, a CAD model, a shape model, or the like of the environment.

Additionally, although a list of the coordinate values of the corner points extracted from the image is used as the feature distribution calculated by the distribution calculation unit 101 in the first embodiment, the feature distribution is not limited thereto, and may be any distribution expressing a distribution of features that can be observed. For example, the feature distribution may be a feature probability distribution. Additionally, the features need not be corner points, and may be features used to calculate the position and orientation of the measurement viewpoint or features that are correlated with those features. For example, the features may be image features such as Scale Invariant Feature Transform (SIFT) features, line segments, intensity gradients, locations that respond to an image filter, or the like.

Variation 1-2

It is sufficient that the decision unit 102 be capable of deciding on the feature pattern, and the layout position thereof, such that the feature distribution is suitable for the calculation of the position and orientation of the measurement viewpoint. For example, although the two-dimensional position of each region (that is, the center coordinates) obtained when the image is divided into the rectangular regions is used to calculate the feature layout position candidates in the first embodiment, the calculation is not limited thereto. The feature layout position candidates may be regions obtained by dividing measured data or an environmental space, and thus, for example, may be divided regions obtained by region segmentation carried out on the basis of type recognition of objects within the image, regions specified by the user through a GUI or the like, and so on.

Second Embodiment

Overview

The first embodiment describes a configuration in which a feature pattern, and the layout position thereof, suitable for the accurate calculation of the position and orientation of a camera in an environment are decided on and presented to the user. In the second embodiment, three-dimensional information is measured in addition to the two-dimensional image of the environment, and the size of the feature pattern is also decided on in addition to deciding on the suitable feature pattern and layout position thereof. Accordingly, in the second embodiment, the HMD 110 includes a camera and a three-dimensional measuring sensor as the measurement device 111; meanwhile, the distribution calculation unit 101 obtains a three-dimensional shape of the environment and obtains a three-dimensional position of the features (corner points) detected from an image captured of the environment. A registration evaluation value expressing the level of uniformity of a distribution of the three-dimensional positions of the corner points is then calculated, and the feature pattern, and the layout position thereof, are decided on so that the registration evaluation value increases. Meanwhile, the size of the feature pattern is decided on on the basis of the size of a surface specified with respect to a space of the layout position (for example, the size of a surface specified through surface fitting). Furthermore, the feature pattern that has been decided on is output to the printer. Accordingly, by the user laying out the output feature pattern in the environment in accordance with instructions displayed in HMD 110, a space in which the feature pattern is arranged in a suitable manner can be obtained.

Configuration

The configuration according to the second embodiment is similar to the configuration according to the first embodiment illustrated in FIG. 1. The differences therebetween will mainly be described hereinafter.

The HMD 110 is provided with a camera capable of capturing a two-dimensional image and a three-dimensional sensor capable of capturing a range image as the measurement device 111, and the display device 112. The distribution calculation unit 101 obtains a three-dimensional distribution of features by detecting corner points from the two-dimensional image obtained by the measurement device 111 as features and obtaining three-dimensional positions corresponding to the detected corner points from the range image. In the second embodiment, a list of three-dimensional coordinates of the corner points is used as the feature distribution.

The decision unit 102 decides on the feature pattern, and a position where that feature pattern is to be laid out, on the basis of the three-dimensional distribution of features obtained by the distribution calculation unit 101. In the second embodiment, an evaluation value expressing the level of uniformity of the three-dimensional distribution of features is used as the registration evaluation value, and a three-dimensional position at which the registration evaluation value is enhanced by a predetermined amount or more when the feature pattern is laid out is decided on as the layout position of the feature pattern. Additionally, as in the first embodiment, the decision unit 102 decides on the feature pattern having a high pattern evaluation value as the feature pattern to be laid out. At this time, the decision unit 102 also decides on the size of the feature pattern that can be laid out, on the basis of the three-dimensional information of the environment.

The presenting unit 103 generates a composite image by superimposing an image, for the case where the feature pattern decided on by the decision unit 102 is laid out in the position decided on by the decision unit 102, on an image captured by the measurement device 111, and outputs the generated image to the display device 112 of the HMD 110. At this time, the presenting unit 103 uses the three-dimensional information obtained by the three-dimensional sensor of the measurement device 111 to generate and present a composite image re-creating the appearance of the feature pattern actually being laid out in the scene.

Flow of Processing

A flow of processing according to the second embodiment will be described using the flowchart in FIG. 2. Parts of the processing according to the second embodiment are the same as the processing according to the first embodiment, and thus the differences therebetween will mainly be described hereinafter.

In step S201, the distribution calculation unit 101 obtains a distribution of features that can be observed through the measurement device 111. In the second embodiment, the distribution calculation unit 101 calculates a list of the three-dimensional positions of the corner points observed by the measurement device 111 provided in the HMD 110 as the feature distribution. Specifically, the distribution calculation unit 101 obtains, from the measurement device 111, the two-dimensional image captured by the camera and the range image measured by the three-dimensional sensor as the measured data of the environment. Then, by detecting the corner points from the two-dimensional image and obtaining, from the range image, three-dimensional coordinates corresponding to two-dimensional coordinates at which the corner points were detected, the distribution calculation unit 101 calculates three-dimensional positions (three-dimensional coordinates) of the corner points as seen from the camera.

In step S202, the decision unit 102 decides on the feature pattern to be laid out, the size thereof, and a three-dimensional position and orientation at which to lay out the feature pattern, on the basis of the feature distribution (the distribution of the three-dimensional positions of the corner points) and the measured data of the environment measured by the measurement device 111. The processing of this step will be described in detail later.

Figure 5:
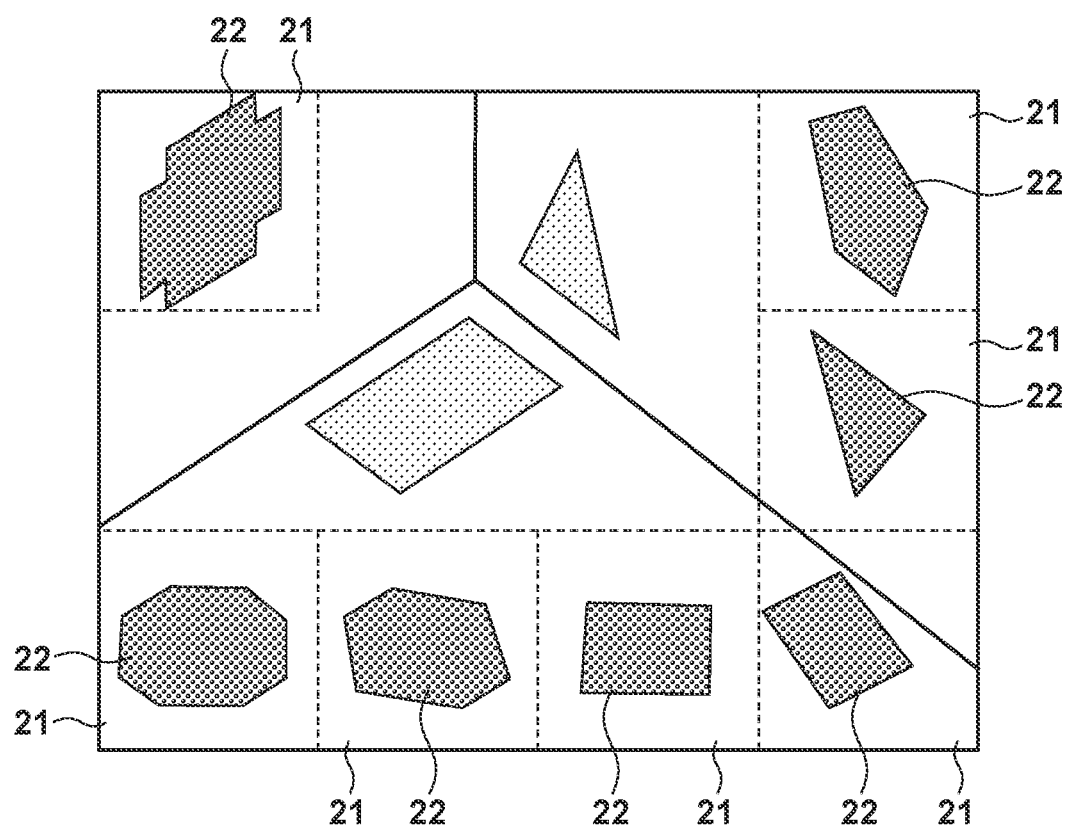
FIG. 5 is a diagram illustrating an example of a presented image according to a second embodiment.

In step S203, the output unit 121 outputs the feature pattern to the output device 122 in accordance with the feature pattern and the size thereof decided on in step S202, and prints the feature pattern. Then, in step S204, the presenting unit 103 generates a composite image for the case where the feature pattern decided on in step S202 is laid out in the three-dimensional position and orientation that have been decided on, and displays the generated image in the display device 112. FIG. 5 illustrates an example of an image in which the feature pattern, the size thereof, and the layout position and orientation are presented, when the environment illustrated in FIG. 3A has been captured by the camera. The image displayed is generated as follows.

The presenting unit 103 first calculates the position and orientation of the measurement viewpoint of the measurement device 111 from the range image of the environment measured by the measurement device 111 using a Simultaneous Localization and Mapping (SLAM) technique. Next, the presenting unit 103 generates simulation images 22 of the feature pattern, as observed from the position and orientation of the measurement viewpoint of the measurement device 111 when the feature pattern decided on in step S202 is laid out in the three-dimensional position and orientation decided on in step S202. The presenting unit 103 then superimposes the simulation images 22 on corresponding rectangular regions 21 of the image captured by the camera of the measurement device 111. The user may then lay out the printed feature patterns in accordance with the presented image so as to match the states of the feature patterns indicated in the simulation images 22.

Next, the processing performed by the decision unit 102, or in other words, the processing carried out in step S202 in which the feature pattern, the size thereof, and the layout position thereof are decided on, will be described in detail using the flowchart in FIG. 4. Much of the processing is the same as in the first embodiment, and thus differences from the first embodiment will mainly be described hereinafter.

In step S401, the decision unit 102 sets a correction target for the feature distribution. In the second embodiment, a sum of voxels containing a predetermined number of features or more is used as the registration evaluation value, and thus a number N of features contained in the voxels is set as the correction target for the feature distribution. Note that a default value (1, for example) may be set in the case where the correction target is not set. Next, in step S402, the decision unit 102 obtains the attribute information of the environment. As in the first embodiment, the image measured by the measurement device 111 is analyzed, and a ratio of straight lines among lines detected from the image is calculated as the content attributes of the environment.

In step S403, the decision unit 102 generates a plurality of positions where features can be added as feature layout position candidates. Specifically, the feature layout position candidates are generated through the following procedure. First, with respect to the three-dimensional distribution of features obtained in step S201, the decision unit 102 calculates and holds the registration evaluation value for evaluating the quality of the accuracy at which the measurement device estimates the position and orientation. The registration evaluation value is a value expressing the level of uniformity of the distribution of the three-dimensional positions of the corner points in the image, and is calculated for a given feature distribution through the following procedure, for example. First, the space of the environment that can be observed by the measurement device 111 is divided to generate a voxel space. In the case where, for a voxel that can be observed from the measurement viewpoint, N or more corner points are contained in that voxel, 1 is added to the registration evaluation value and the sum obtained is taken as the registration evaluation value.

Next, the decision unit 102 divides the image into non-overlapping rectangular regions of a predetermined size, carries out surface fitting on the range image corresponding to each rectangular region, and holds the layout position and orientation determined from the three-dimensional position and orientation of a center of that surface, and region information of the surface, as the feature layout position candidate. Note that the layout position and orientation include, for example, a layout position indicating a three-dimensional position of the center of the surface, and a layout orientation in which the orientation of the surface serves as a Z direction and a vertical direction serves as a Y direction. Meanwhile, in the case where a plurality of surfaces are specified for a single rectangular region, the surface having a greatest surface area is employed.

Next, the decision unit 102 calculates and holds a registration evaluation value for a feature distribution in the case where a provisional feature pattern has been added to each feature layout position candidate. As in the first embodiment, a feature pattern selected at random from the feature pattern DB 104 is used as the provisional feature pattern, and the same feature pattern is used for each feature layout position candidate. Furthermore, the decision unit 102 extracts, from the feature layout position candidates, feature layout position candidates for which the amount of enhancement of the registration evaluation value becomes a predetermined value or more in the case where the feature pattern is laid out, and generates a final feature layout position candidate list.

Step S404a to step S404b are a processing loop for executing the processes of S405 to S407 for each feature layout position candidate. The decision unit 102 carries out the process for selecting the feature pattern to be laid out (S405 to S407) for each feature layout position candidate existing in the feature layout position candidate list generated in step S403.

Step S405a to step S405b are a processing loop for executing the process of calculating the pattern evaluation value, carried out in step S406, for each feature pattern candidate registered in the feature pattern DB 104. As in the first embodiment, the decision unit 102 selects the feature pattern at which the pattern evaluation value calculated in step S406 is maximum, for each of the feature layout position candidates denoted in the feature layout position candidate list generated in step S403. Furthermore, on the basis of the surface region information held in the feature layout position candidates, the decision unit 102 decides on the size of the feature pattern to be printed such that the feature pattern fits within the three-dimensional surface region of the feature layout position while being at a maximum size. Specifically, the size of the feature pattern may be decided on through a dichotomizing search while testing whether or not the feature pattern fits within the surface region, for example.

According to the second embodiment, the processing described above makes it possible to decide, output, and present to a user a feature pattern, a size thereof, and a three-dimensional position and orientation in which to lay the feature pattern out, that are suitable for accurately calculating the position and orientation of the measurement device. Accordingly, the user can know the feature pattern to be laid out and the layout position thereof in three dimensions, and the feature pattern to be laid out is printed with the size thereof decided on in a suitable manner, which makes it possible to shorten the time required for the task of laying out the feature pattern.

Variation 2-1

In the second embodiment described above, measured data (an image and a range image) obtained by the measurement device 111 constituted of a camera and a three-dimensional sensor is used by the distribution calculation unit 101 to calculate the feature distribution; however, the measured data is not limited thereto. The measured data may, for example, be obtained from a storage device (not illustrated), or may be obtained using a simulation image of the environment generated on the basis of a shape model of the environment, a range image, or the like.

Additionally, the features of the feature distribution are not limited to corner points; features that can be used to calculate the position and orientation of the measurement viewpoint, such as three-dimensional features, three-dimensional points, and three-dimensional line segments, or features correlated with such features, may be used as well. Additionally, the feature distribution is not limited only to positions, and may be a distribution of orientations; a number of points expressing the accuracy of the distribution may be used as well. The feature distribution is also not limited to a list of three-dimensional coordinates; the distribution may be a probability distribution or an orientation distribution, or a number of points expressing the accuracy of the distribution may be used.

Variation 2-2

In the second embodiment, when obtaining the feature layout position candidates, a three-dimensional position and orientation are obtained from a surface fitted to the range image; however, the candidates are not limited thereto. For example, positions of voxels obtained by dividing a three-dimensional space of the environment, positions of divided regions obtained by region segmentation of measured data such as images, range images, three-dimensional point groups, and so on, the position and orientation of geometrical information such as surfaces extracted from the divided regions, and the like may be used as well. The region may also be specified by the user through a GUI.

Third Embodiment

Overview

The first and second embodiments describe methods in which the feature pattern to be laid out is selected from the feature pattern DB 104. However, rather than preparing a feature pattern in advance, a feature pattern may be generated as necessary in accordance with the environment and used. A third embodiment will describe a method for generating and outputting a feature pattern in accordance with a feature distribution of the environment, using the configuration described in the second embodiment as a base. Note that it is clear that by applying the configuration of the third embodiment to the first embodiment, a configuration in which a feature pattern is generated in accordance with the environment can be realized instead of the configuration in which the feature pattern is selected from the feature pattern DB 104.

Configuration

The configuration according to the third embodiment is the same as the configuration according to the second embodiment (FIG. 1), but the processing performed by the decision unit 102 is different. Differences between the third embodiment and the second embodiment will mainly be described hereinafter. Note that in the present embodiment, corner points are used as the features used to calculate the position and orientation of the camera. Accordingly, the decision unit 102 generates the feature pattern such that the corner points are distributed uniformly throughout the environment and the feature pattern is suitable for the environment.

Flow of Processing

Figure 6:
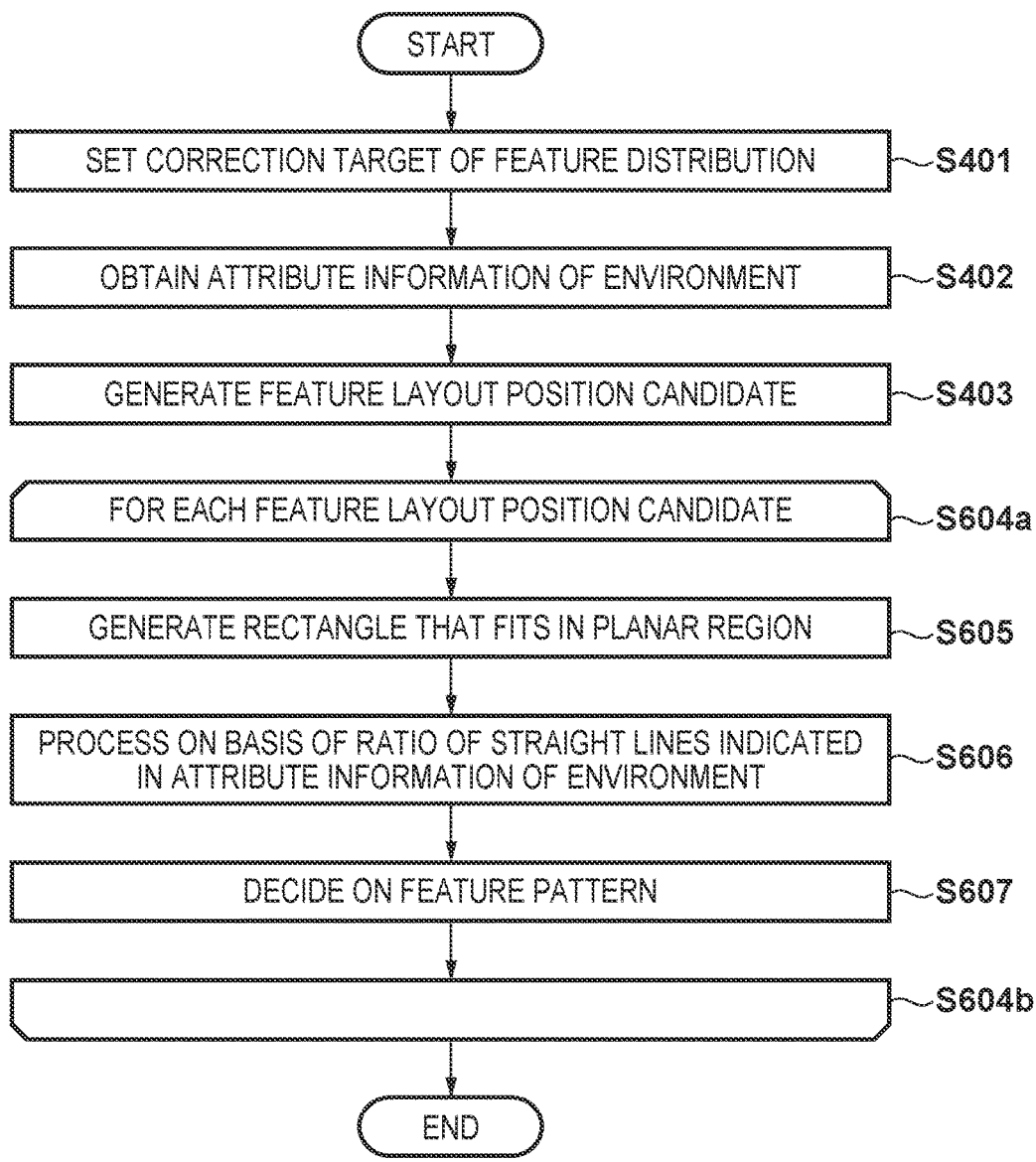
FIG. 6 is a flowchart illustrating a process for deciding on a feature pattern and a layout position according to a third embodiment.

The flow of processing according to the third embodiment is similar to the flow of processing according to the second embodiment described with reference to the flowchart in FIG. 2, but the processing in step S202, in which the feature pattern and the layout position thereof are decided on, is different. The processing of step S202 according to the third embodiment will be described hereinafter using the flowchart in FIG. 6. In FIG. 6, steps S401 to S403 are the same as in the second embodiment. In a loop from step S604a to S604b, the decision unit 102 generates a suitable feature pattern for each of the feature layout position candidates generated in step S403.

The decision unit 102 generates the feature pattern by combining graphics. In step S605, the decision unit 102 first generates a rectangle that fits into a three-dimensional planar region from surface region information held in the feature layout position. Specifically, the short sides and long sides of the rectangle are decided on using a dichotomizing search. Next, in step S606, the decision unit 102 processes the generated rectangle so as to have the same ratio of straight lines as the ratio of straight lines detected from the image obtained by measuring the environment, which is the attribute information of the environment obtained in step S402. To be more specific, rectangles, circles, or the like generated at random positions and sizes are progressively eliminated from the rectangle generated in step S605 until a difference between the ratio of straight lines in the attribute information of the environment and the ratio of straight lines in the generated graphic is less than or equal to a predetermined threshold. At this time, in the case where the number of features that can be detected from the feature pattern has become less than the number N specified in step S401, the graphic is generated again such that N or more features (corner points) can be detected. Note that in the case where the number of features that can be detected is still lower than N after a predetermined number of regenerations, the processing for generating the graphic may be suspended, and a graphic in which N or more features can be detected may be generated regardless of the ratio of straight lines indicated in the attribute information of the environment.

In step S607, the decision unit 102 decides on the graphic generated as described above as the feature pattern to be laid out in the feature layout position candidate of interest, and stores that graphic. The stored feature pattern is output to the output device 122 by the output unit 121 and printed in step S203.

According to the third embodiment, a feature pattern suitable for accurately calculating the position and orientation of the measurement device is generated automatically through the processing described above. Additionally, the layout position and orientation of that feature pattern is also decided on automatically and presented to the user. As a result, the user can lay out a suitable feature pattern even in the case where features suitable for the calculation of the position and orientation of the measurement viewpoint, the environment, and so on cannot be prepared.

Variation 3-1

In the third embodiment, a feature pattern suitable for the environment is generated by combining primitive shapes such as rectangles and circles. However, the method for generating the feature pattern is not limited thereto. The primitive shapes may be any kind of shape, such as ellipses or polygons, and the method for combining may use any type of operation, such as addition, subtraction, or an XOR operation. Additionally, the shape is not limited to a two-dimensional shape, and a three-dimensional shape such as a polyhedron, a prism, or a sphere may be used as well. Additionally, the feature pattern may be generated using a polynomial expression, a function, fractals, or the like expressing the shape, and a large feature pattern may be generated by combining a plurality of feature patterns. Furthermore, the environment may be measured and the shape, texture, and the like of an object existing in the environment may be copied.

The shapes of these feature patterns are decided on on the basis of parameters such as the primitive types or operation types to be combined, coefficients of the polynomial expression, IDs of the shapes or textures to be copied, intervals between and arrangements of the feature patterns, and so on. Accordingly, a combination of parameters for generating a feature pattern in which the pattern evaluation value is greater than or equal to a predetermined threshold may be decided on using random searching, genetic algorithms, nonlinear optimization, or the like. For example, the parameters of a function for generating the feature pattern may be found by solving a nonlinear optimization problem in which an evaluation function expressing the pattern evaluation value is minimum, and the feature pattern may be generated using the parameters that have been found.

Furthermore, from an image obtained by capturing the environment, a color or texture that resembles the environment and from which features can be detected may be set as the color of the feature pattern, or the texture may be applied to the feature pattern. For example, if a color existing abundantly in the environment or a background color at the feature layout position is extracted and a color having the same saturation and hue as that color but having a greatly different brightness is decided on, a color that resembles the environment and from which features can be detected can be decided on.

Furthermore, the feature pattern may be generated by setting parameters for deciding on the shape of the feature pattern at random, and the feature pattern may then be registered in the feature pattern DB 104 and employed in the methods described in the first and second embodiments.

Fourth Embodiment

Overview

When a feature is observed at close range, the feature occupies a large ratio of the observation range, and thus has a large effect on the feature distribution; however, in the case where a feature having the same surface area (or volume) is observed from far away, the feature occupies a smaller ratio of the observation range, and thus has a smaller effect on the feature distribution. Accordingly, a fourth embodiment will describe a method, used in a system employing the position and orientation of the measurement viewpoint, for deciding on and outputting feature patterns and layout positions thereof sufficient for accurately calculating the position and orientation of the measurement viewpoint, within a moving range of the measurement viewpoint.

Configuration

As described above, a feature pattern laid out in a position closer to the measurement viewpoint will occupy a greater ratio of the measurement range and thus will have a greater effect on the feature distribution, or in other words, will have a greater effect on the accuracy of estimating the position and orientation of the measurement viewpoint. Accordingly, in the present embodiment, the layout position of the feature pattern is calculated for a plurality of measurement viewpoints within a moving range, and the feature pattern, the size thereof, and the layout position is decided on so that the feature distribution of feature layout position candidates close to the measurement viewpoint is uniform and is suitable for the environment.

FIG. 7 is a block diagram illustrating the information processing apparatus 100 according to the fourth embodiment. The configuration of the information processing apparatus 100 according to the fourth embodiment will be described hereinafter. As in the second embodiment, the information processing apparatus 100 includes the distribution calculation unit 101, the decision unit 102, the presenting unit 103, and the feature pattern DB 104. However, a moving range obtainment unit 105 has been added to the information processing apparatus 100 according to the fourth embodiment. The HMD 110, the measurement device 111, the display device 112, the output unit 121, and the output device 122 have the same configurations as in the second embodiment. Differences from the second embodiment will mainly be described hereinafter.

The moving range obtainment unit 105 obtains the moving range of the measurement viewpoint in the system that uses the position and orientation of the measurement viewpoint. In the present embodiment, a list of positions and orientations of the measurement viewpoint is read out from a storage device (not illustrated) and used as the moving range. Note that the list of positions and orientations is created by periodically obtaining position and orientation information from the measurement device 111 at predetermined time intervals and recording that information as a list. In the present embodiment, the moving range obtainment unit 105 generates the list of positions and orientations. The decision unit 102 decides on the feature pattern to be laid out, the layout position thereof, and the size thereof on the basis of the feature distribution obtained by the distribution calculation unit 101 and the moving range obtained by the moving range obtainment unit 105. In the present embodiment, the feature pattern, the size thereof, and the layout position is decided on so that the feature distribution of feature layout position candidates close to the measurement viewpoint is uniform and is suitable for the environment.

Flow of Processing

In the fourth embodiment, a feature pattern having a high pattern evaluation value at a feature pattern layout position that enhances the registration evaluation value by greater than or equal to a predetermined amount when observed from a plurality of viewpoints within the moving range is decided on as the feature pattern that is to be laid out. Note that in the case where feature pattern layout positions overlap, the feature layout position closer to the measurement viewpoint is selected. Processing according to the present embodiment will be described in detail next using the flowchart in FIG. 8. Parts of the flow of processing according to the present embodiment are the same as in the flow of processing according to the second embodiment (the flowchart in FIG. 2), and thus the following will mainly describe the differences.

In step S801, the moving range obtainment unit 105 reads out, from a storage device (not illustrated), the moving range of the measurement viewpoint in the system that uses the position and orientation of the measurement viewpoint. Here, a list of the positions and orientations of the measurement viewpoint is obtained as described above. Next, in step S802, the distribution calculation unit 101 obtains a distribution of features that can be observed through the measurement device 111. In the present embodiment, a list of three-dimensional positions of corner points observed at a plurality of measurement viewpoints obtained in step S801 is calculated as the feature distribution. To be more specific, using a two-dimensional image and a range image observed at each of the measurement viewpoints, a list of three-dimensional coordinates corresponding to the corner points detected from the images is obtained as the feature distribution. The feature distribution is obtained for each measurement viewpoint. Here, a coordinate system of the features is a reference coordinate system of the environment. Note that the process for obtaining the feature distribution for each measurement viewpoint is the same as that described in the second embodiment (step S201).

In step S803, the decision unit 102 decides on the feature pattern to be laid out, the size thereof, and the layout position thereof on the basis of the feature distributions constituted of the distributions of the three-dimensional positions of the corner points, as well as the measured data of the environment measured by the measurement device 111 and the moving range obtained in step S801. The processes of steps S203 and S204 thereafter are the same as in the second embodiment. The processing of step S803 will be described in detail hereinafter using the flowchart in FIG. 4.

In step S401, the decision unit 102 sets a correction target for the feature distribution. Like the second embodiment, in the present embodiment, a sum of voxels containing a predetermined number of features or more is used as the registration evaluation value, and thus a target value N for the number of features contained in the voxels is set as the correction target for the feature distribution. Note that a default value (1, for example) may be set in the case where the correction target is not set. Next, in step S402, the decision unit 102 obtains the attribute information of the environment. As in the first to third embodiments, the decision unit 102 analyzes the image measured by the measurement device 111 for calculating the degree of matching, calculates the ratio of straight lines among the lines detected from the image, and uses that ratio as the attribute information of the environment.

In step S403, the decision unit 102 generates the feature layout position candidates on the basis of the moving range obtained in step S801 (the list of positions and orientations of the measurement viewpoints) and the feature distribution obtained in step S802 (the list of three-dimensional positions of the corner points). Specifically, the decision unit 102 generates the feature layout position candidates through the following procedure.

First, the decision unit 102 generates voxel spaces obtained by dividing the environment space. Then, the decision unit 102 calculates the registration evaluation value for each measurement viewpoint in the moving range. Here, as in the second embodiment, the sum of voxels containing N or more features that can be observed from the measurement viewpoint is used as the registration evaluation value. Note that the measurement viewpoints to be processed are the measurement viewpoints registered in the list of positions and orientations. Alternatively, a desired point in the moving range of a measurement viewpoint decided on from the plurality of registered measurement viewpoints may be extracted as the measurement viewpoint. For example, a point selected at random from the set moving range may be taken as the measurement viewpoint to be processed.

Next, the decision unit 102 carries out the process for calculating the feature layout position candidate for each of the measurement viewpoints. The calculation of the feature layout position candidates for each of the measurement viewpoints is the same as in the second embodiment. Specifically, the decision unit 102 carries out surface fitting on the range image corresponding to each rectangular region obtained by dividing the image observed from each measurement viewpoint, calculates a layout position and orientation, determined from the three-dimensional position and orientation of the center of that surface, and surface region information, and takes this as the feature layout position candidate. Next, the decision unit 102 calculates a registration evaluation value for a feature distribution in the case where a provisional feature pattern has been added to each feature layout position candidate, extracts feature layout position candidates at which the amount of enhancement of the registration evaluation value is greater than or equal to a predetermined value, and generates a final feature layout position candidate list. Feature layout position candidates generated from a plurality of measurement viewpoints are intermixed in the final feature layout position candidate list.

Step S404a to step S404b are a processing loop for executing the processes of S405 to S407 for each candidate in the feature layout position candidate list. The decision unit 102 carries out the process for selecting the feature pattern to be laid out (S405 to S407) for each feature layout position candidate existing in the feature layout position candidate list generated in step S403. However, unlike the second embodiment, feature layout position candidates generated from a plurality of viewpoints are intermixed. As described above, feature patterns having the same size will occupy a greater ratio of the field of view from the measurement viewpoint the closer the layout position is to the measurement viewpoint, and will thus have a greater effect on the calculation of the position and orientation of the measurement viewpoint. Accordingly, in the present embodiment, in the case where there are overlapping feature layout position candidates, the feature layout position candidate closer to the measurement viewpoint is selected. Specifically, in the case where a plurality of feature layout position candidates are associated with a single voxel, the feature layout position candidate generated from a closer measurement viewpoint is left, while the more distant feature layout position candidates are removed from the feature layout position candidate list.

Step S405a to step S405b are a processing loop for executing the process of calculating the pattern evaluation value, carried out in step S406, for each feature pattern candidate registered in the feature pattern DB 104. The decision unit 102 carries out the process for calculating the pattern evaluation value (S406) for each of the feature pattern candidates registered in the feature pattern DB 104. In step S406, the decision unit 102 calculates the pattern evaluation value for the feature pattern candidate in a feature layout position candidate of interest in the same manner as in the second embodiment, for each feature pattern candidate registered in the feature pattern DB.

In step S407, the decision unit 102 selects the feature pattern candidate having the highest pattern evaluation value calculated in step S406 as the feature pattern to be laid out in the feature layout position candidate currently being processed. Furthermore, on the basis of the surface region information held in the feature layout position, the decision unit 102 decides on the size of the feature pattern to be printed such that the feature pattern fits within the three-dimensional surface region of the feature layout position while being at a maximum size.

Through the processing described above, the feature pattern, the layout position thereof, and the size thereof suitable for calculating the position and orientation of the camera accurately can be decided on in a given measurement viewpoint in the moving range of the measurement viewpoints, which makes it possible to shorten the time required for the task of laying out the feature pattern.

Variation 4-1

The fourth embodiment takes a plurality of measurement viewpoints into consideration, and in the case where feature layout position candidates overlap among the measurement viewpoints, the feature pattern and layout position thereof is decided on by prioritizing the feature layout position closest to the measurement viewpoint. However, the method for deciding on the feature pattern and the layout position thereof is not limited thereto. The detectability of the feature pattern may be taken into consideration, and the feature pattern and layout position thereof that can be detected from a given measurement viewpoint may be decided on. Specifically, processing such as that described hereinafter may be carried out in step S202 of the fourth embodiment. Parts of this processing that differ from the above-described fourth embodiment will be described in detail using the flowchart in FIG. 4. Note that here, each feature pattern held in the feature pattern DB 104 is assumed to have a detectable distance range from a maximum detectable distance to a minimum detectable distance, as the registration attributes.

In step S403, the decision unit 102 obtains the layout position and orientation of the feature pattern and the feature layout position candidate holding the surface region information. Furthermore, the decision unit 102 associates a voxel, among the voxels obtained by dividing the environment space, that includes the surface region of the feature layout position candidate as a candidate voxel for the feature layout position, and associates that voxel with the feature layout position candidate. Then, for each candidate voxel, decision unit 102 stores a maximum value and minimum value of distances calculated from the center of the candidate voxel to each measurement viewpoint, as an observation range of that candidate voxel.

In a processing loop from step S404a to S404b, the decision unit 102 carries out a process for deciding on the feature pattern for each of the feature layout position candidates generated in step S403. However, in this processing loop, the processing is carried out in order from the largest surface area of the surface regions (layout surfaces) held by the feature layout position candidates, and when the processing is finished, a layout complete flag is set in the voxel associated with the feature layout position candidate. Thereafter, the processing is skipped for the feature layout position candidates associated with voxels in which the layout complete flag is set.

Steps S405a to S405b constitute a loop in which processing is carried out on each feature pattern candidate registered in the feature pattern DB 104. However, a feature pattern candidate having, as the registration attributes, a detectable distance range corresponding to the observation range held by the voxel associated with the feature layout position candidate of interest, is selected from the feature pattern DB 104 as a target of the processing of this processing loop. In step S406, the decision unit 102 calculates the pattern evaluation value for the feature layout position candidate of interest in the same manner as in the fourth embodiment, for each feature pattern candidate selected as a target of the processing.

In step S407, the decision unit 102 selects the feature pattern candidate having the highest pattern evaluation value calculated in step S406 as the feature pattern to be laid out. Furthermore, on the basis of the surface region information held in the feature layout position, the decision unit 102 decides on the size of the feature pattern to be printed such that the feature pattern fits within the three-dimensional surface region of the feature layout position while being at a maximum size. Although the foregoing describes selecting a feature pattern in which the maximum value and minimum value of the distance from the voxel (the surface region of the feature layout position candidate) to a plurality of measurement viewpoints are within the detectable distance range, it is also possible to use only the maximum value. In other words, a feature pattern in which the maximum value of the distance from the voxel (the surface region of the feature layout position candidate) to a plurality of measurement viewpoints is within the detectable distance range may be selected. In this case, it is sufficient for only the maximum distance to be specified as the detectable distance range.

Variation 4-2

The moving range of the measurement viewpoint is not limited to a list of the positions and orientations of the measurement viewpoints, and may be any form that enables a range of viewpoints from which features of the environment can be observed to be obtained. A region expressing such a range of viewpoints may be a three-dimensional region or a two-dimensional region. In addition to the range of viewpoints, an observation direction, a field of view, and so on may be obtained as the moving range. This is because the voxels that serve as layout position candidates can be limited on the basis of the observation direction, the field of view, and so on, and thus the feature pattern layout position can be presented in a more suitable manner. The method of obtaining the moving range of the viewpoints is not limited to loading the range from a storage device; for example, the range may be obtained by being specified by the user through a GUI, or may be obtained from a result of the user measuring the state of movement.

For example, in the case where a three-dimensional region is used as the moving range, the decision unit 102 samples a three-dimensional position from that three-dimensional region at predetermined intervals. Next, the sampled three-dimensional position is multiplied by sight line directions of the entire periphery, and the result is taken as the position and orientation of the measurement viewpoint. The sight line directions of the entire periphery are found by calculating a direction from a center to the apex of a geodesic dome having a predetermined number of divisions. Meanwhile, the sight line directions need not be of the entire periphery, and for example, a range that the sight lines can take on may be obtained in addition to the moving range, after which the range of the sight line directions is narrowed down.

Variation 4-3

In Variation 4-1, when deciding on the feature layout position candidate, the detectability of the features is evaluated on the basis of a distance between the voxel and the measurement viewpoint (that is, the observation range of the voxel). Here, the observation range of the voxel may be the maximum value and the minimum value of the distance to the measurement viewpoint at which the voxel can be observed, or may simply be a maximum distance and a minimum distance between the entire moving range and the voxel.

Meanwhile, the registration matching degree in the detectable distance range may be evaluated on the basis of a relationship between the moving range of the viewpoint and the feature layout position. For example, as a distance Z between the viewpoint and the feature layout position increases, the observable size in the image becomes $1/Z$, and thus the registration matching degree may be evaluated in accordance with the distance between the viewpoint and the feature layout position. In this case, the evaluation value (registration matching degree) may be multiplied by $1/Z$ in accordance with the distance Z, for example. Meanwhile, with normal cameras, the feature pattern will be observed with more distortion as the feature pattern is observed at more of an angle instead of straight on. For example, when an angle of a line of sight relative to an object plane is represented by $\theta$, the size in the image will be $\sin\theta$ times, which makes it difficult to detect the feature. As such, the evaluation may take an angle between the viewpoint and the feature layout position into consideration. In this case, the evaluation value may be multiplied by sine in accordance with the angle $\theta$, for example.

Variation 4-4

In the above-described embodiments, the size of the feature pattern is described as the maximum size that can fit into the surface region; however, the size is not limited thereto, and the size of the feature pattern need not be a maximum size that can fit into the surface regions held by the feature layout position candidates. For example, the size may be decided on such that the detectable distance range for the size of a feature pattern having a high degree of matching matches the observation range. In other words, a feature pattern having a high degree of matching, and a size thereof, may be decided on such that the size fits within the surface region of the feature layout position candidate and the detectable distance range corresponds to the observation range.

Additionally, a feature pattern that meets a given condition may be generated by combining a plurality of feature patterns. For example, feature patterns having different detectable distance ranges may be combined so as to obtain a pattern that corresponds to the observation range. The observation range may be taken into consideration in the combination, and a gap between the combined feature patterns may be set. When many similar patterns are present in the environment, erroneous correspondences may arise when calculating the position and orientation of the measurement viewpoint and lead to a drop in accuracy, and thus the selection and generation of feature patterns resembling a feature pattern that has already been decided on may be avoided. The combination of feature patterns can be found by solving a combination optimization problem, defining an evaluation function in which conditions are realized as formulae, searching for a combination having a high evaluation value using a genetic algorithm, or the like.

Variation 4-5

With respect to the method for calculating the feature layout position candidates, in the first to fourth embodiments, the image is divided into rectangular regions and the feature layout position is calculated; however, the method is not limited thereto. Regions obtained by dividing the measured data or the environment space may be taken as the feature layout position candidates, and for example, segmented regions obtained by performing region segmentation on the image, regions specified by the user through a GUI, or the like may be used as the feature layout position candidates.

Variation 4-6

An evaluation scale expressing the accuracy of the calculation of the position and orientation of the measurement device (that is, the registration evaluation value) may be any scale correlated with the accuracy of the calculation of the position and orientation at a given viewpoint. Accordingly, although the first to fourth embodiments describe a sum of rectangular regions or voxels containing a predetermined number of features as the registration evaluation value used as the scale expressing the uniformity of the feature distribution, the scale is not limited thereto. For example, a variance or standard deviation of a probability distribution of positions and orientations of features may be used as the evaluation value, or a ratio of lengths between axes when primary component analysis is carried out on the positions and orientations of the features may be used as the evaluation value. Furthermore, the number, ratio, or the like of the features may be used as a reliability of the feature distribution (in other words, the evaluation scale), and the feature distribution may then be weighted. Furthermore, the accuracy of calculation in the case where the position and orientation of the measurement viewpoint is calculated for that feature distribution may be calculated and used as the evaluation scale. The accuracy of the position and orientation can, on the basis of measurement error in the features used to calculate the position and orientation, be calculated using the method disclosed in W. Hoff and T. Vincent, "Analysis of head pose accuracy in augmented reality," IEEE Trans. Visualization and Computer Graphics, Vol 6., No. 4, 2000.

As the method for deciding on the feature layout position in accordance with the registration evaluation value, any method that can select or order the feature layout position candidates with which the registration evaluation value increases by laying out the feature pattern in that position can be used. Although the first to fourth embodiments describe extracting a position at which the registration evaluation value is enhanced by a predetermined amount or more as the feature layout position, a list in which feature layout position candidates having registration evaluation values greater than or equal to a threshold arranged in order from candidates having higher evaluation values may be calculated.

Variation 4-7

In the first to fourth embodiments, a feature pattern having a high pattern evaluation value expressing the degree to which the feature pattern attributes and the environment attributes match is selected in order to select a suitable feature pattern. Although a product of the registration matching degree and the content matching degree of the feature pattern is used as the pattern evaluation value in the first to fourth embodiments, the pattern evaluation value is not limited thereto. Any index expressing whether or not the feature pattern is suitable for the environment may be used as the pattern evaluation value; for example, it is possible to use a weighted sum of the registration matching degree and the content matching degree, only the registration matching degree, only the content matching degree, and so on. Additionally, a feature pattern having a higher content matching degree may be selected from feature patterns having registration matching degrees that are higher than a predetermined value, or a feature pattern having a higher content matching degree may be selected from feature patterns having content matching degrees that are higher than a predetermined value.

Furthermore, although the number of detectable features is used as the registration matching degree in the first to fourth embodiments, the registration matching degree may be any index expressing to what degree the feature pattern contributes to the calculation of the position and orientation of the measurement viewpoint, and is not limited to the above-described embodiments. For example, if the features used to calculate the position and orientation of the measurement viewpoint are line segments, an index based on the number of line segments detected may be used. Whether a spatial frequency, an image frequency, or the like is suitable for the feature detection method may be evaluated as well. An index expressing whether or not the overall feature distribution observed from the measurement viewpoint is uniform may be used, or the registration evaluation value obtained when the feature pattern is laid out may be used as well.

The content matching degree is also not limited to a ratio of straight lines. The content matching degree may be any index expressing to what degree the environment and the feature pattern match, and may be any index expressing a degree of conformity between the content attributes held by the feature pattern and the content attributes of the environment. For example, an index based on a degree of similarity of the shape of the feature pattern and a shape present in the environment, such as a ratio or number of similar geometric features, may be used, or an index based on a degree of similarity between colors, such as a hue or saturation, may be used. In other words, as long as properties of the environment can be index, the evaluation may use a degree of similarity according to any type of index.

Additionally, when selecting the feature pattern, a scene in the environment may be recognized, and matching using keywords, categories, or the like assigned to the feature patterns may then be carried out. For example, if information such as a time, a season, a place, or the like where an application used to measure the position and orientation is used as the attributes of the environment, a degree of matching between those attributes and the attributes held by the feature patterns may be used as an index for selecting the feature pattern. Attributes based on content information, user information, or the like of the application may be used as the attributes of the environment. For example, if the content of the application is dinosaurs, a degree of similarity with keywords or categories of the content, a display location, TPO (a time, location, season, purpose, and so on for the content) may be used as the degree of matching so as to increase a degree of matching with feature patterns such as vegetation related to dinosaurs, annotations of displays, information placards, and so on. Furthermore, a degree of matching with user attributes such as preferences, age, sex, and so on may be used.

Variation 4-8

The first to fourth embodiments describe examples in which the layout position of the feature pattern is decided on, after which the feature pattern suitable for the layout position is decided on. However, the feature pattern may be decided on first, after which the layout position thereof is decided on, or the feature pattern and the layout position of the feature pattern may be decided on simultaneously. For example, in response to the feature pattern to be laid out being specified, the position where the registration evaluation value is highest when that feature pattern is laid out in one of the sampled feature layout position candidates may be used as the layout position.

Additionally, the feature pattern and the layout position of the feature pattern may be used as parameters, and the parameters where the pattern evaluation value is highest may be found through a genetic algorithm, for example. Specifically, the feature pattern and the layout position of the feature pattern are decided on by:

defining a function for the pattern evaluation value in which an ID of the feature pattern and the layout position of the feature pattern serve as parameters; and using a genetic algorithm to search for parameters at which the pattern evaluation value is highest in the case where the feature pattern indicated by the parameters is laid out in the layout position indicated by the parameters.

However, the method for finding the parameters is not limited thereto. Any method through which the parameters at which the pattern evaluation value is the highest may be used, such as nonlinear optimization, simulated annealing, a full search, or the like.

Variation 4-9

In the first embodiment, the feature pattern is printed using a printer; however, the feature pattern may be output in any form as long as the output unit 121 can output the feature pattern. For example, the shape of the feature pattern may be cut out using a cutting plotter and used as the feature pattern, paint may be applied to a wall surface or the like using a cutout as a mask, or the pattern may be painted directly onto a wall surface using paint. Furthermore, the feature pattern is not limited to a two-dimensional graphic, and may be a painting, a poster, an information placard, a symbol, text, or the like. Furthermore, the feature pattern may be any item that can be laid out in the environment, such as paper, a sticker, a magnet, wallpaper, paint, or the like. In other words, the feature pattern may be any item from which a feature used to calculate the position and orientation of the measurement viewpoint can be detected.

Additionally, the feature pattern is not limited to being two-dimensional, and may be three-dimensional instead. When calculating the position and orientation of the measurement viewpoint, a more stable and accurate calculation can be made when the features are distributed three-dimensionally. A three-dimensional feature pattern makes it easier to distribute the features three-dimensionally and is thus often more preferable than a two-dimensional feature pattern. In the case where the feature pattern is three-dimensional, a shape, color, and so on of the feature pattern may be printed using a 3D printer. Meanwhile, a three-dimensional shape may be generated by stacking a plurality of two-dimensional prints, or a three-dimensional shape may be generated by folding or processing a two-dimensional print.

Furthermore, if an existing object is used as the feature pattern, the output unit 121 need not be provided. For example, objects such as chairs or desks, existing posters or paintings, and so on may be registered as feature patterns in the feature pattern DB 104 and used.

Variation 4-10

The presenting unit 103 may be any unit capable of presenting the feature pattern to be laid out, the position thereof, or the position and orientation to the user. Furthermore, in step S407, the presenting unit 103 may present a list of feature patterns arranged in a preferred order (in order from the highest evaluation), and the user may then be allowed to select the feature pattern to be laid out. Additionally, the presentation of the layout position of the feature pattern by the presenting unit 103 may be carried out by using an HMD, projector, or the like to display the feature pattern and the layout position thereof superimposed on an actual environment, or may be carried out using CG in which the environment is rendered in a normal display.

Note that in order to carry out the superimposed display on the environment, it is necessary to know the position and orientation of the viewpoint of the projector, HMD, or the like. With a fixed-position projector, the position and orientation of a projection viewpoint may be measured in advance. Meanwhile, with a pan-tilt projector, a mobile projector, or an HMD, in which the position and orientation change while running, the position and orientation of the projector may be found using control information, monitor information, or the like of a pan-tilt mechanism. Additionally, the position and orientation of the display device may be measured using a measurement device such as a tracking camera, a magnetic sensor, or the like, or the position and orientation of the display device may be measured by analyzing measured data from a measurement device attached to the display device. Additionally, in the case where the projector is mounted in a robot, the position and orientation of the display device may be obtained using control information, monitor information, or the like of the robot.

EFFECTS OF EMBODIMENTS

According to the method of presenting a layout position of a feature pattern of the first embodiment, the user can know the feature pattern to be laid out and the layout position thereof without trial and error, which makes it possible to shorten the time required for the task of laying out the feature pattern. Meanwhile, according to the method of presenting a layout position of the feature pattern of the second embodiment, the user can know the feature pattern to be laid out and the layout position thereof three-dimensionally. Additionally, the feature pattern to be laid out is printed with the size thereof decided on, which makes it possible to shorten the time required for the task of laying out the feature pattern. Additionally, according to the method of presenting a layout position of a feature pattern of the third embodiment, a favorable feature pattern can be generated and laid out even in the case where a feature pattern suitable for calculating the position and orientation of a measurement viewpoint, suitable for the environment, and so on cannot be prepared. Furthermore, according to the method of presenting a layout position of a feature pattern of the fourth embodiment, a feature pattern, a layout position thereof, and a size thereof suitable for accurately calculating the position and orientation of a camera at a given measurement viewpoint within a moving range of the measurement viewpoint can be decided on. Additionally, the time required for the task of laying out the feature pattern can be shortened.

Definitions

The distribution calculation unit 101 may be any unit capable of calculating a distribution of observable features, and the data used in the calculation may be any information capable of re-creating the environment, such as images, range images, three-dimensional point groups, shape information such as three-dimensional shape models or CAD models of the environment, and so on. Additionally, the data used in the calculation may be obtained by a measurement device such as a camera or three-dimensional sensor, or may be read out from a storage device. The feature distribution may be a two-dimensional distribution or a three-dimensional distribution. Meanwhile, the feature distribution may be a distribution of image features, three-dimensional features, or the like extracted from the above-described data, or may be a probability distribution. Furthermore, the feature distribution is not limited only to positions, and may be a distribution of orientations; a number of points expressing the accuracy of the distribution may be used as well.

The decision unit 102 may be any unit capable of deciding on the feature pattern, and the layout position thereof, such that the feature distribution enhances the accuracy of the calculation of the position and orientation of the measurement device 111. Additionally, the decision unit 102 may decide on a feature pattern suitable for the environment, and may decide on a size of the feature pattern. Furthermore, the decision unit 102 may first decide on the layout position of the feature pattern (the feature layout position) and then decide on the optimal feature pattern for that layout position, or may decide on the feature pattern first and then decide on the layout position thereof. Alternatively, the feature pattern and the layout position thereof may be decided on simultaneously.

The feature layout position candidate may be any position at which the evaluation scale (registration evaluation value), which expresses the accuracy at which the position and orientation of the measurement viewpoint is calculated, is enhanced when the feature pattern is laid out in that position. The feature layout position candidate may be a two-dimensional position in the image presented to the user, or may be a three-dimensional position, a position and orientation, or the like in the environment space. Additionally, the position of a region obtained by dividing data such as an image of the environment, a range image, or a three-dimensional model, a position (two-dimensional or three-dimensional) of the region specified by the user through a GUI or the like, and so on may be used as the feature layout position candidate. Alternatively, the position, orientation, or the like of a region obtained by region segmentation of data may be used as the feature layout position candidate.

The registration evaluation value may be any scale correlated with the accuracy of the calculation of the position and orientation at a given viewpoint. The sum of cells containing features may be used as in the first to fourth embodiments, the area of or number of features in a feature distribution may be used, or a calculation accuracy in the case where the position and orientation of the measurement device is calculated in that feature distribution may be used as the evaluation scale. The feature distribution may be two-dimensional or three-dimensional.

In a preferred method for deciding on the feature pattern, a feature pattern having a high pattern evaluation value, which corresponds to a degree of matching (the registration matching degree) for calculating the position and orientation of the feature pattern, may be decided on. Additionally, the pattern evaluation value may include an index expressing whether the feature pattern conforms to the environment (the content matching degree). Furthermore, a feature pattern having a higher content matching degree may be selected from among feature patterns having registration matching degrees that are greater than a predetermined value. Conversely, a feature pattern having a higher registration matching degree may be selected from among feature patterns having content matching degrees that are greater than a predetermined value. A plurality of feature patterns may be decided on as the feature pattern to be laid out. Additionally, the feature pattern to be laid out may be decided on by presenting a list of ordered feature patterns and allowing the user to select a preferred feature pattern.

A product of the registration matching degree and the content matching degree may be used as the pattern evaluation value. Meanwhile, the pattern evaluation value may be a weighted sum of the registration matching degree and the content matching degree, the registration matching degree only, or the content matching degree only. The pattern evaluation value may be any evaluation value including an index expressing whether the feature pattern is suitable for calculating the position and orientation and whether the feature pattern conforms to the environment.

The registration matching degree may be any index expressing whether the feature pattern is suitable for calculating the position and orientation of the measurement viewpoint. For example, if the features used are line segments, an index based on the number of line segments detected may be used; if the features used are three-dimensional features, an index based on the number of three-dimensional features detected may be used. The registration matching degree may be evaluated on the basis of a spatial frequency, an image frequency, or the like.

The content matching degree may be any index expressing to what degree the environment and the feature pattern match, and may be any index expressing a degree of conformity between the content attributes held by the feature pattern and the content attributes of the environment. For example, the content matching degree may be an index based on a degree of similarity of the shape of the feature pattern and a shape present in the environment, such as a ratio or number of similar geometric features, or may be an index based on a degree of similarity between colors. Additionally, the content matching degree may be evaluated by recognizing a scene in the environment and then carrying out matching with keywords, categories, or the like assigned to the feature patterns. Additionally, if information such as a time, a season, a place, or the like where an application used to measure the position and orientation is used as the attributes of the environment, the content matching degree may include an index indicating matching between those attributes and attributes held by the feature pattern. The attributes of the environment may be attributes based on content information, user information, or the like of the application.

The presenting unit 103 may be any unit capable of presenting the feature pattern to be laid out, the position thereof, or the position and orientation to the user. Furthermore, the presenting unit may present a list of feature patterns arranged in a preferred order to the user, and may then allow the user to select the feature pattern to be laid out. The presenting unit may use a normal display to present the feature pattern to be laid out and the position thereof to the user as CG in which the environment is rendered. Additionally, the presenting unit may use an HMD, a projector, or the like to display the feature pattern to be laid out superimpose on the layout position in the actual environment.

The output unit 121 may be any unit capable of outputting the feature pattern. The feature pattern may be generated through printing by a printer, or the pattern may be cut out using a cutting plotter. In the case where the feature pattern is three-dimensional, a shape, color, and so on of the feature pattern may be printed using a 3D printer. Meanwhile, a three-dimensional shape may be generated by stacking a plurality of two-dimensional prints, or a three-dimensional shape may be generated by folding or processing a two-dimensional print.

The moving range obtainment unit 105 may be any unit capable of obtaining a range of viewpoints at which features of the environment can be observed (observation viewpoints) as a moving range. The moving range may be expressed as a three-dimensional region, or may be expressed as a two-dimensional region. In addition to the range of observation viewpoints, an observation direction, a field of view, and so on may be obtained as the moving range. The moving range may be obtained as a list of positions and orientations of the observation viewpoints. The obtainment of the moving range is not limited to read out from a storage device; the moving range may be specified by the user through a GUI, or the moving range may be obtained from a result of the user measuring a state of movement.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-008282, filed Jan. 19, 2016, which is hereby incorporated by reference herein in its entirety.

What is claimed is:

1. An information processing apparatus comprising:
   a calculation circuit configured to obtain a feature distribution by calculating a distribution of features, existing in an environment, that can be used to measure a position and orientation of a measurement viewpoint;
   a deciding circuit configured to decide on a feature pattern to be laid out and a layout position of the feature pattern in the environment that enable the obtainment of a feature distribution according to a criteria for measuring accuracy at which the position and orientation of the measurement viewpoint is calculated; and
   a presenting circuit configured to present the feature pattern and the layout position of the feature pattern decided on by the deciding circuit.

2. The apparatus according to claim 1,
   wherein the deciding circuit decides on the feature pattern to be laid out and the layout position of the feature pattern such that a uniformity of the feature distribution in the environment is enhanced.

3. The apparatus according to claim 1,
   wherein the deciding circuit decides on the feature pattern to be laid out and the layout position of the feature pattern further taking into consideration an evaluation of a degree to which the feature pattern at the layout position matches the environment.

4. The apparatus according to claim 3,
   wherein the degree of matching to the environment is a degree to which attribute information of the environment matches attribute information of the feature pattern.

5. The apparatus according to claim 4,
   wherein the deciding circuit obtains the attribute information of the environment by analyzing an image obtained by capturing the environment.

6. The apparatus according to claim 5,
   wherein the attribute information of the environment is a ratio of straight lines among detected lines contained in the image.

7. The apparatus according to claim 1,
   wherein the deciding circuit decides on the feature pattern to be laid out from among a plurality of feature patterns prepared in advance.

8. The apparatus according to claim 1,
   wherein the deciding circuit generates the feature pattern to be laid out by combining graphics.

9. The apparatus according to claim 1,
wherein the deciding circuit lays out a plurality of feature patterns in the layout position.

10. The apparatus according to claim 1,
wherein the deciding circuit specifies a size of a layout surface in a region where the feature pattern is laid out, and decides on a size of the feature pattern on the basis of the specified size.

11. The apparatus according to claim 10,
wherein the deciding circuit decides on the layout surface by carrying out surface fitting, using a range image of the environment, on each of regions obtained by dividing a two-dimensional image of the environment.

12. The apparatus according to claim 1,
wherein the calculation circuit calculates the feature distribution as a distribution of features of the same type as a feature used to calculate the position and orientation of the measurement viewpoint.

13. The apparatus according to claim 12,
wherein the feature used to calculate the position and orientation of the measurement viewpoint is a corner point that exists in the environment.

14. The apparatus according to claim 1, further comprising:
an obtainment circuit configured to obtain a moving range of the measurement viewpoint,
wherein the deciding circuit decides on the feature pattern to be laid out and the layout position of the feature pattern such that the accuracy at which the position and orientation of the measurement viewpoint is calculated is enhanced at a measurement viewpoint within the moving range.

15. The apparatus according to claim 14,
wherein in the case where the same layout position is used for a plurality of measurement viewpoints within the moving range, the deciding circuit decides on the feature pattern having prioritized a measurement viewpoint, among the plurality of measurement viewpoints, that is closest to the layout position of the feature pattern.

16. The apparatus according to claim 14,
wherein for feature pattern layout position candidates determined from each of a plurality of measurement viewpoints within the moving range, the deciding circuit decides on the feature pattern to be laid out from among feature patterns for which a maximum value of a distance from the layout position candidate to the plurality of measurement viewpoints is within a detectable distance range.

17. The apparatus according to claim 1, further comprising:
an output circuit configured to output the feature pattern decided to be laid out by the deciding circuit to an output apparatus which outputs the feature pattern as an object that can actually be laid out.

18. The apparatus according to claim 1, further comprising:
a camera configured to measure the environment,
wherein the calculation circuit calculates the feature distribution on the basis of measured data measured by the camera.

19. The apparatus according to claim 18,
wherein the measured data is an image obtained by capturing the environment using a camera.

20. The apparatus according to claim 19,
wherein the measured data further includes a range image.

21. A control method for an information processing apparatus, the method comprising:
obtaining a feature distribution by calculating a distribution of features, existing in an environment, that can be used to measure a position and orientation of a measurement viewpoint;
deciding on a feature pattern to be laid out and a layout position of the feature pattern in the environment that enable the obtainment of a feature distribution according to a criteria for measuring accuracy at which the position and orientation of the measurement viewpoint is calculated; and
presenting the feature pattern and the layout position of the feature pattern that have been decided on.

22. A non-transitory computer-readable storage medium on which is stored a program for causing a computer to execute an information processing method, the method comprising:
obtaining a feature distribution by calculating a distribution of features, existing in an environment, that can be used to measure a position and orientation of a measurement viewpoint;
deciding on a feature pattern to be laid out and a layout position of the feature pattern in the environment that enable the obtainment of a feature distribution according to a criteria for measuring accuracy at which the position and orientation of the measurement viewpoint is calculated; and
presenting the feature pattern and the layout position of the feature pattern that have been decided on.

* * * * *